C. W. AUE.
COUPLING MECHANISM FOR LOG CARRIAGES.
APPLICATION FILED SEPT. 11, 1916.
1,252,644.
Patented Jan. 8, 1918.
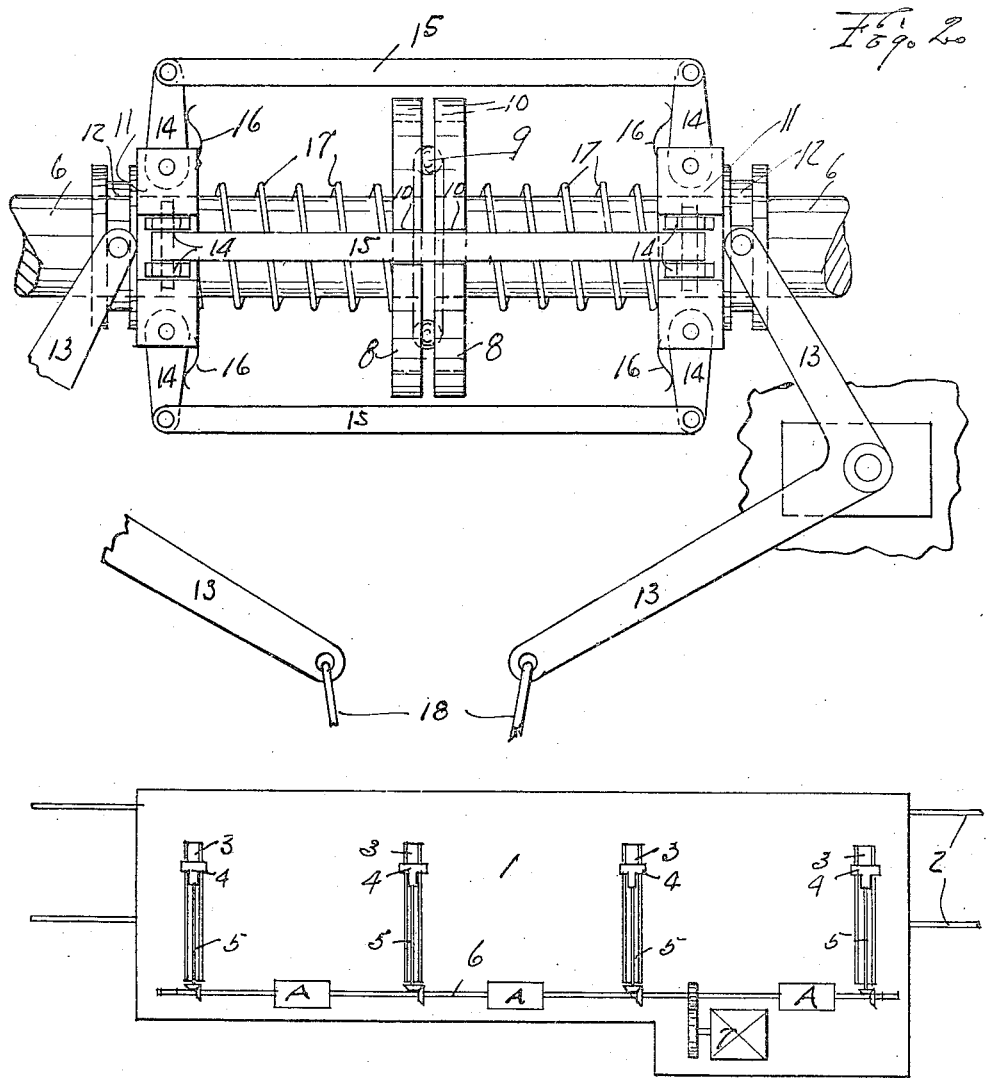
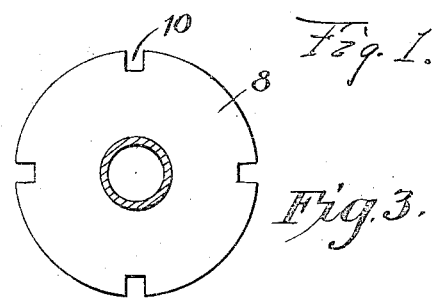

UNITED STATES PATENT OFFICE.

CARLTON W. AUE, OF GRANITE FALLS, WASHINGTON.

COUPLING MECHANISM FOR LOG-CARRIAGES.

1,252,644.   Specification of Letters Patent.   Patented Jan. 8, 1918.

Application filed September 11, 1916. Serial No. 119,360.

*To all whom it may concern:*

Be it known that I, CARLTON W. AUE, a citizen of the United States, and a resident of Granite Falls, in the county of Snohomish, State of Washington, have invented certain new and useful Improvements in Coupling Mechanism for Log-Carriages, of which the following is a full, true, and exact specification.

My invention relates to taper setting devices and more particularly to the means employed for coupling the shaft sections of the log carriage mechanism.

Other objects will appear as my invention is more fully explained in the following specification, illustrated in the accompanying drawing and pointed out in the appended claims.

In the drawings, Figure 1 is an outline plan view of a log carriage with my device shown in proper relationship thereto. Fig. 2 is an enlarged detail view of my device.

Fig. 3 is a detail face view of one of the flange rings for receiving the end of one of the shaft sections, the sleeve being shown in section.

Referring more particularly to the drawings, numeral 1 indicates a log carriage which is designed to run upon a track 2. Mounted upon carriage 1 are parallel head block ways 3 upon which head blocks 4 are slidably mounted. The head blocks are usually advanced by means of screw shafts 5 one of which operates each head block. All of the screw shafts 5 are geared to the common line shaft 6 which is revolved by means of a set works 7. All of the above is usual and is designed to advance or retard all of the head blocks in unison. My device as indicated by letter A is cut in shaft 6 between each pair of head blocks and is designed to permit the independent operation of each of the said head blocks from the common set works 7. The arrangement and operation of my device is shown in detail in Fig. 2 and includes the cutting of line shaft 6 into sections to the adjacent ends of which are secured collars 8. A ball race and ball bearings 9 are provided between the adjacent collars 8. The collars 8 are similar and are provided with notches 10 uniformly spaced around their periphery. Similar shift rings 11 are slidably and revolubly mounted upon the shafts 6 and are provided with grooves 12 which engage the ends of bell crank levers 13. Radially outstanding from shift rings 11 are links 14 the inner ends of which are pivoted to the said shift rings and the outer ends of which are pivoted to lock bars 15. The lock bars 15 are each common to a pair of links 14 one of which is mounted upon each of the shift rings 11. Leaf springs 16 normally retain the links 14 in a radial and outstanding position. Coil springs 17 which lie intermediate the collars 8 and the shift rings 11 are provided to force the shift rings apart when they are released by the movement of bell cranks 13. The bell cranks 13 are controlled by means of rods 18 which lead to a common point of operation adjacent the set works 7. The device in Fig. 2 is shown in an unlocked position; that is, either section of shaft 6 is free to turn independent of the adjacent section. When it is desired to positively connect the shaft sections 6 the bell cranks 13 are released and the springs 17 shove the shift rings 11 apart with the result that the lock bars 15 are thrown into engagement with the notches 10 and the collars 8, thereby positively connecting rotatably the adjoining sections of shaft 6. The device is released by operating the bell cranks 13. It will be understood that each unit A is operated independently of the other units and that by means of the positive coupling and uncoupling of adjacent shaft 6 it is possible to advance each successive head block more than the adjacent one.

While I have shown a particular form of embodiment of my invention, I am aware that many minor changes therein will readily suggest themselves to others skilled in the art without departing from the spirit and scope of the invention, and I therefore desire to avoid being limited to the exact form shown and described.

Having described my invention, what I claim as new and desire to protect by Letters Patent, is—

1. In combination, a pair of abutting shafts each provided with an annular flange having peripheral notches, a collar slidably mounted on each shaft, pivoted links extending from the collars, rods connecting the corresponding links of the two collars, means for actuating the collars to rock the links and cause the rods to engage the notches and couple the shafts together, and means for reversely operating the collars to uncouple the shafts.

2. In combination, a pair of abutting shafts, each provided with an annular flange having peripheral notches, a collar slidably mounted on each shaft, pivoted links extending from the collars, rods connecting the corresponding links of the two collars, springs interposed between each collar and adjacent flange to move the collars and actuate the links and draw the rods into the notches to couple the shafts together, and means for reversely operating the collars to uncouple the shafts.

3. In combination, a pair of alined shafts, flanges secured to the ends of said shafts, collars slidably mounted on the shafts, a plurality of radially movable elements connecting the two collars and adapted to coöperate with the flanges to couple the shafts together, springs for moving the collars to coupling position, and means for reversely moving the collars to uncoupling position.

CARLTON W. AUE.

Copies of this patent may be obtained for five cents each, by addressing the "Commissioner of Patents, Washington, D. C."